June 30, 1953 R. E. BUSCH 2,643,392
ARTIFICIAL EYE
Filed March 29, 1945
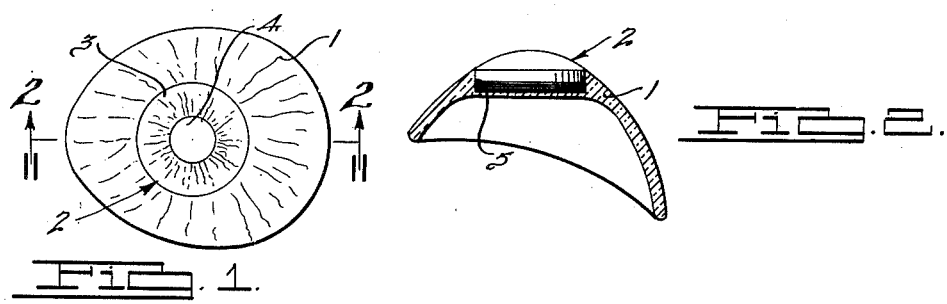
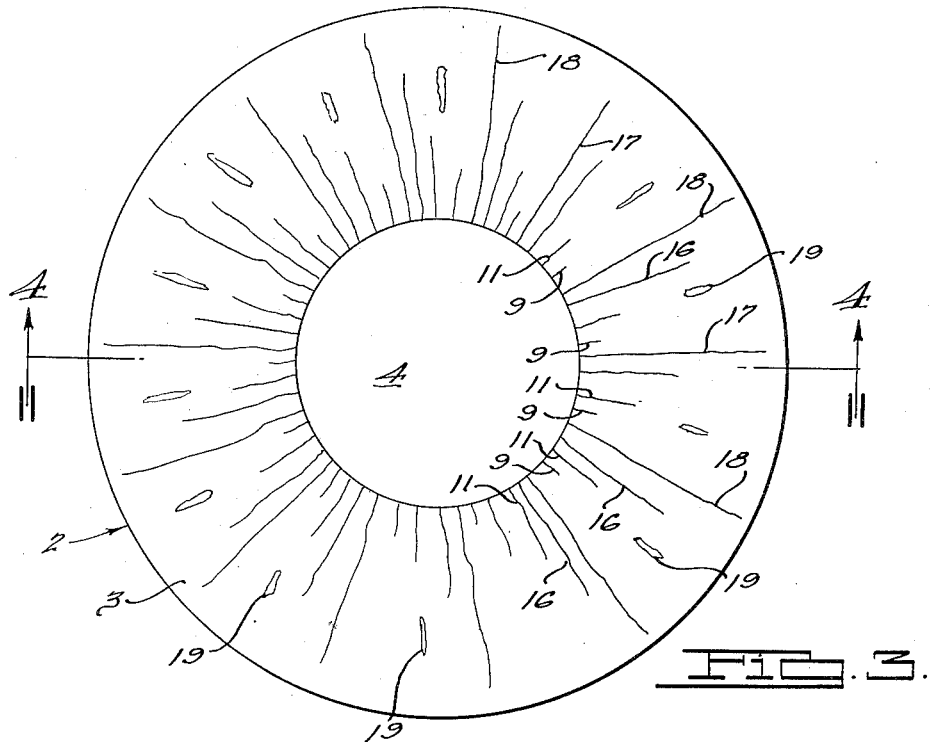
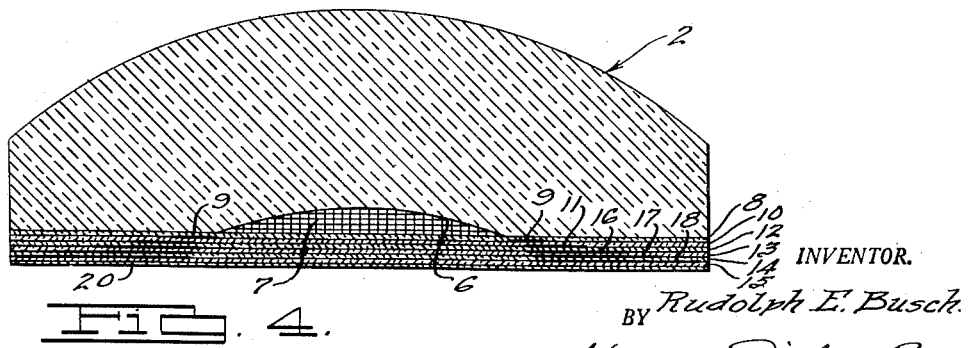
INVENTOR.
BY Rudolph E. Busch
Harness, Dickey & Pierce
ATTORNEYS.

Patented June 30, 1953

2,643,392

UNITED STATES PATENT OFFICE 2,643,392

ARTIFICIAL EYE

Rudolph E. Busch, Detroit, Mich., assignor to American Optical Company, Southbridge, Mass., a voluntary association of Massachusetts Application March 29, 1945, Serial No. 585,434

15 Claims. (Cl. 3—13)

The present invention relates to an improved artificial eye and the method of making the improved eye.

The primary objects of the invention are to provide a more serviceable and more natural appearing artificial eye, and one which can be made without highly skilled artisans or elaborate equipment.

More specifically it is an object of the present invention to eliminate all use of glass in making artificial eyes and to provide an eye formed of a material which has much greater resistance to attack by body fluids than glass.

Another object of the invention is to provide an improved insert iris and pupil element made of a thermoplastic resin.

Another object of the invention is to provide an artificial eye formed of a thermoplastic material which is easy to mold at relatively low temperatures and has many properties peculiarly adapting it to the conditions and requirements of use and manufacture of artificial eyes.

Another object is to provide an improved eye construction and method of making the same, which eye is characterized by its close resemblance to a natural eye.

Other objects and advantages will become apparent from the following specification, the accompanying drawings, and the appended claims.

In the drawings in which like numerals are applied to like parts in the several views, Figure 1 is a front elevation of an artificial eye constructed in accordance with the present invention;

Figure 2 is a section taken on the line 2—2 of Figure 1.

Figure 3 is an elevation view of the iris and pupil insert employed in the construction of Figures 1 and 2, shown on a greatly enlarged scale; and Figure 4 is a section taken on the line 4—4 of Figure 3.

As best shown in Figures 1 and 2, the artificial eye comprises two elements, a main body portion 1 which represents what is generally referred to as the "white" of the eye or the eyeball, and a generally button-shaped insert indicated generally at 2, representing the iris 3 and the pupil 4 of the eye.

The main body portion 1 is formed of a transparent thermoplastic resin having a suitable pigment incorporated therein. Any suitable organic thermoplastic material may be employed. Transparent acrylic resins are satisfactory, but the preferred acrylic resin is methyl methacrylate resin, due to the fact that it may be molded at relatively low pressure and temperature (from 180° F. to 212° F.) in inexpensive plaster dies and may be reheated and reshaped readily by hand, if necessary, in order to fit any particular eye socket. The use of plaster dies is of great advantage since they may be made cheaply, easily, and quickly, and may be made readily from wax impressions. Methyl methacrylate resin is exceedingly transparent and highly resistant to acid, alkalies, and most organic and inorganic chemicals, including salt water. Consequently, it is not attacked by any of the body fluids with which it comes in contact. Moreover it is readily dissolved in a monomer of the resin itself. Consequently, the monomer of the resin may be used as a solvent or plasticizer to facilitate molding, to bend separate elements together, or to liquefy the resin so that it may be applied with a brush or by spraying and may be mixed with coloring pigment.

Some of the advantages of the present invention may be realized if other transparent thermoplastic resins are used, but most others are subject to the disadvantage that they require higher pressures and temperatures for molding and therefore, require the use of metal dies.

One difficulty with prior artificial eyes has been the difficulty of producing a plastic eye member in which the white portion has the somewhat granular appearance of a natural eye. Previous attempts to produce artificial eyes from plastic resins have resulted in an undesirable glossiness or flatness in the appearance of the white of the eye. In accordance with the present invention this difficulty is overcome by forming the main body portion 1 of the eye by mixing granular plastic material with a dry pigment of the proper color, namely, an off-white or slightly yellowish color, depending upon the eye which is to be matched. No solvents are employed in this mixing, but the granular plastic and the pigment are simply ground together in any suitable manner, as by mortar and pestle. The mixture is then placed in a mold and bonded together under heat and pressure. The resulting eyeball has an exceedingly natural granular appearance and may be completed by application of vein lines, if desired. These lines are preferably applied by dissolving a quantity of the plastic in a solvent with a suitable coloring pigment and applying the pigmented liquid to the eyeball by means of a very fine brush.

The main body portion of the eye, as best shown in Figure 1, is provided with a recess 5 for reception of the iris and pupil button 2. In accordance with the present invention this button is also formed of a transparent thermoplastic resin, preferably a methyl methacrylate resin. As best shown in Figures 3 and 4, the transparent button 2 has a circular concave recess 6 formed in the back face thereof. This recess is filled or coated with a body or layer 7 of plastic material incorporating a suitable coloring pigment. In the usual case this pigment will be black and the layer will be entirely opaque. The material of the layer is formed by dissolving a plastic in a solvent and combining the dissolved plastic with the pigment material. After the layer 7 is applied to the back of the button, it is allowed to harden either by air drying or with the application of heat. Thereupon, the entire back surface of the button is provided with a thin layer 8 of transparent plastic material. This material is applied in liquid form after being dissolved in a suitable solvent. It may be applied either by a brush or spray and, after application, is allowed to dry and harden.

The coloring material necessary to represent the iris portion 3 of the eye is then built up on the back face of the button 2 surrounding the pupil 7. In order to produce an eye having an exceedingly natural appearance, it is usually necessary to employ a relatively large number of different shades or colors, and in most cases the colored areas must be distributed in depth. The number of shades and distribution of the colors varies with the eye to be reproduced.

The desired effect is produced in accordance with the present invention by applying colored plastic material in liquid form to the back surface of the button in minute spaced areas in successive layers, with the result that no two areas of different shades or colors are contiguous in a single layer. The layers are preferably quite thin, and each may be in the order of only one to two thousandths of an inch thick. The form, location, and arrangement of the colored areas, as well as the colors of each area, depend upon the eye which is being imitated but, for purposes of illustration, a representative coloring procedure is shown in the drawings.

Referring to Figures 3 and 4, the first step in the application of the colored plastic may reside in the application to the back of the transparent layer 8 of a plurality of very fine, radially extending, spaced, colored lines 9, a few of which are indicated in Figures 3 and 4. It will be observed that these lines are relatively short. The spacing between them and the colors employed will depend upon the appearance desired. After the areas 9 are colored, a second transparent layer of plastic material 10 is applied to the back of the button and allowed to dry. Thereafter a second series of areas 11 of a slightly different shade or color are applied to the back of the layer 10. It will be noted from Figure 3 that the lines 11 are offset with respect to the lines 9. The colored areas in different layers may be offset either radially or circumferentially with respect to each other, or they may be offset both radially and circumferentially, as shown in Figure 3. Consequently, the colors will appear to be at slightly different depths in the finished eye.

The above described process is repeated as many times as necessary, building up successive layers of transparent plastic separated by relatively offset spaced colored areas. In general, the colors employed in each layer differ from those between other layers and, in general, the coloring material between successive layers is located progressively closer to the outer periphery of the button. The number of layers required in any given case depends upon the number of colors and shades in the iris and may be anywhere from two to fifteen. In the particular construction illustrated six transparent layers are shown, namely, the layers 8, 10, 12, 13, 14, and 15, and between each pair of transparent layers there is provided a plurality of spaced colored areas or lines indicated 9, 11, 16, 17, and 18, respectively.

In addition to the lines or areas 9, 11, 16, 17, and 18, which usually extend more or less radially, there may be occasional splotches of different colors distributed through the iris region. A number of these are illustrated in Figure 3, and indicated by the numeral 19. These may be located between any pair of transparent layers, as they are not contiguous to any colored area between the same two layers.

On the back of the last transparent layer 15 there is applied a continuous layer 20 of plastic material which is suitably colored with a relatively dark background color for the iris. It will be noted that all of the previously mentioned color areas in the iris terminate short of the outer periphery of the button 2. Consequently, the background layer 20 will be visible as a continuous ring surrounding the iris. In addition it may appear to some degree in other areas of the iris through the spaces, if any, between the colored areas 9, 11, 16, 17, 18, and 19.

The plastic material employed in the pupil 7, the layers 8, 10, 12, 13, 14, and 15 and the colored areas 9, 11, 16, 17, 18, 19, and 20 are preferably a methyl methacrylate resin which is dissolved in a monomer of the resin and combined, in the case of the colored areas, with suitable pigments. The small colored areas are preferably applied by a fine, single hairbrush. The other layers may be applied by either brush or spray.

As a result of this construction, the iris of the eye, which gives it its characteristic appearance, will have its coloring material distributed in depth and also varied in shading, coloring, and structural make-up in an exceedingly natural manner. An important feature of this improved method of producing an artificial iris resides in the fact that the pigmenting material is applied cold and may be dried or hardened very quickly, either with or without the application of heat. Consequently, it is possible to build up the successive layers at room temperature with very little effort and within a very short period. In addition, since no heat is essential, it is possible to employ pigments which cannot be used because of their inability to withstand heat. This greatly increases the range of colors, shades, and pigments which may be required to reproduce any given effect. Finally, the completed button, all portions of which being preferably formed of the same plastic material, is a homogeneous unit and may be readily cemented or bonded to the main eyeball member 1 within the socket 5 thereof. If, thereafter, the eye is heated under light pressure the monomeric liquid used as the cement and solvent will polymerize to form the resin. The resulting artificial eye is a one-piece unit and is entirely homogeneous throughout and exceedingly natural in appearance.

After the assembly of the elements 1 and 2, the front surface of the assembly may be suitably finished and polished, and the entire eye may be reshaped at a relatively low temperature, if necessary, to fit the eye socket.

What is claimed is:

1. The method of making the iris and pupil portion of an artificial eye which consists in forming a button of transparent thermoplastic resin of the desired diameter, painting a representation of the pupil on the back of the button with a pigmented drying material, applying a layer of transparent drying material over said pigmented material after the pigmented material has dried, and applying a plurality of successive layers of alternate pigmented and unpigmented drying material to the back of the button to represent the iris of the eye, each pigmented layer being formed as a plurality of separate areas at least partially offset with respect to pigmented areas in other layers and each pigmented area being of a single color, each layer being dried before application of the succeeding layer.

2. The method of making the iris and pupil portion of an artificial eye which consists in forming a button of transparent thermoplastic resin of the desired diameter, painting a representation of the pupil on the back of the button with a pigmented drying material, applying a layer of transparent drying material over said pigmented material after the pigmented material has dried, applying a plurality of successive layers of alternate pigmented and unpigmented drying material to the back of the button to represent the iris of the eye, each pigmented layer being formed as a plurality of separate areas at least partially offset with respect to pigmented areas in other layers and each pigmented area being of a single color, each layer being dried before application of the succeeding layer, and applying a final continuous solid color pigmented layer to the iris portion of the eye to form a background color.

3. The method of making the iris and pupil portion of an artificial eye which consists in forming a button of transparent thermoplastic resin of the desired diameter, painting a representation of the pupil on the back of the button with a pigmented drying liquid material, applying a layer of transparent drying liquid over said pigmented liquid after the pigmented liquid has dried, and applying a plurality of successive layers of alternate pigmented and unpigmented drying liquid to the back of the button to represent the iris of the eye, each pigmented layer being formed as a plurality of separate areas at least partially offset with respect to pigmented areas in other layers and each pigmented area being of a single color, each layer being dried before application of the succeeding layer, said drying liquids consisting of a solution of a thermoplastic resin in a solvent therefor.

4. The method of making the iris and pupil portion of an artificial eye which consists in forming a button of transparent thermoplastic resin of the desired diameter, painting a representation of the pupil on the back of the button with a pigmented drying material, applying a layer of transparent drying material over said pigmented material after the pigmented material has dried, and applying a plurality of successive layers of alternate pigmented and unpigmented drying material to the back of the button to represent the iris of the eye, each layer being dried before application of the succeeding layer.

5. An artificial eye comprising a scleral member having a transparent corneal portion on its forward side and an iris therebetween, said iris embodying a plurality of individual pigmented areas arranged by groups in approximately parallel spaced planes and with said individual areas each being completely separate from the remaining pigmented areas and surrounded by substantially unpigmented transparent plastic so as to be in spaced relation both with the individual areas at different depths and those areas located in approximately the same plane therewith.

6. An artificial eye comprising a scleral member having a transparent corneal portion on its forward side and an iris therebetween, said iris embodying a plurality of individual pigmented areas arranged by groups in approximately parallel spaced planes, said individual areas each being completely separate from the remaining areas and surrounded by substantially unpigmented transparent plastic so as to be in spaced relation both with the individual areas at different depths and those areas located in approximately the same plane therewith, and a continuous coating of pigment disposed beneath said plurality of separated individual pigmented areas and visible through the transparent unpigmented plastic separating said areas.

7. An artificial eye comprising a scleral member having a recess on its forward side and an iris member seated in said recess, said iris member embodying a plurality of superimposed layers of substantially unpigmented transparent plastic having a plurality of individual pigmented areas arranged between each pair of said layers, said individual pigmented areas between each pair of layers being spaced from the remaining pigmented areas between said pairs of layers, and substantially unpigmented transparent plastic filling in the spaces therebetween, and with the individual areas disposed between one pair of layers being at least partially offset from the individual areas disposed between the other pairs of layers of transparent plastic.

8. An artificial eye comprising a scleral member having a recess on its forward side and an iris member seated in said recess, said iris member embodying a plurality of superimposed layers of substantially unpigmented transparent plastic having a plurality of individual pigmented areas arranged between each pair of layers, each of said individual pigmented areas between the pairs of layers being spaced from the remaining pigmented areas therebetween, and substantially unpigmented transparent plastic filling in the spaces therebetween, and with the individual areas disposed between one pair of layers being at least partially offset from the individual areas disposed between the other pairs of layers of substantially unpigmented transparent plastic, said iris member further having a continuous layer of pigmented material disposed beneath said plurality of transparent layers and visible through the transparent plastic filling the spaces between the individual pigmented areas.

9. An artificial eye comprising a scleral member having a transparent corneal portion on its forward side and an iris therebetween, said iris embodying a plurality of radially extending individual pigmented areas arranged by groups in approximately parallel spaced planes, said individual areas of each group each being completely surrounded by substantially unpigmented transparent plastic so as to be separated from and in spaced relation both with the individual areas at different depths and with those areas located in approximately the same plane, and a continuous layer of pigmented material disposed beneath said plurality of spaced individual pigmented areas and visible through the transparent plastic separating said areas.

10. An artificial eye comprising a scleral member having a recess on its forward side and a transparent button seated in said recess, said button having a centrally disposed pupillary member on its under side and a plurality of individual pigmented areas each spaced from the remaining areas and arranged by groups in approximately parallel spaced planes and radially disposed with respect to said pupillary member to simulate a desired iris pattern, and said individual pigmented areas each being completely surrounded by substantially unpigmented transparent plastic so as to be in spaced relation both with the other individual areas at different depths and those areas located in approximately the same plane.

11. An artificial eye comprising a scleral member having a recess on its forward side and a transparent button seated in said recess, said button having a centrally disposed pupillary member on its under side and an iris representation disposed beneath said pupillary member and embodying a plurality of individual pigmented areas each distinctly separated from the others and arranged by groups in approximately parallel spaced planes and radially disposed with respect to said pupillary member to simulate a desired iris pattern, said individual areas each being completely surrounded by substantially unpigmented transparent plastic so as to be in spaced relation both with the other individual areas at different depths and with those areas located in approximately the same plane, and a continuous base layer of pigmented material disposed beneath the pupillary member and iris so as to be visible through the transparent plastic separating said individual pigmented areas.

12. An insert iris and pupil element for an artificial eye comprising a transparent button having a plurality of thin layers of transparent substantially colorless material on the back surface thereof, colored material between the layers, the colored material between each pair of layers being arranged in a plurality of areas each of which are spaced from the other areas in said layer and are at least partially offset with respect to the area of colored material between other pairs of layers to give an appearance of distribution of color in depth within a transparent body, a continuous layer of colored material located behind said plurality of layers and providing a background color for the iris and a separate pupillary member cooperatively associated therewith.

13. The method of making an artificial eye which consists in forming a section of the artificial eye with a face so disposed as to carry thereon in the completed artificial eye the representation of an iris, building up on said face such a representation by applying thereto a plurality of successive layers, alternately of pigmented drying material and unpigmented substantially clear drying material, each layer being dried before application of the succeeding layer, the pigmented drying material being applied as distinctly separate individual areas each spaced on the receiving surface from the other areas, and the unpigmented drying material being applied as continuous coatings filling up the spaces between said spaced pigmented areas and presenting a relatively smooth surface for the succeeding layer, and incorporating said section in the complete artificial eye.

14. The method of making an artificial eye which consists in forming a section of the artificial eye with a face so disposed as to carry thereon in the completed artificial eye the representation of an iris, building up on said face such a representation by applying thereto a plurality of successive layers, alternately of pigmented drying material and unpigmented substantially clear drying material, each layer being dried before application of the succeeding layer, the pigmented drying material being applied as distinctly separate individual areas spaced on the receiving surface from the other areas, and the unpigmented drying material being applied as continuous coatings filling up the spaces between said spaced pigmented areas and presenting a relatively smooth surface for the succeeding layer, each of the succeeding layers embodying pigmented areas further having the pigmented areas thereof offset from the pigmented areas of the precedingly applied layers and incorporating said section in the complete artificial eye.

15. In the method of making an artificial eye embodying a scleral member having a transparent corneal member on its forward side and an iris disposed therebetween, the steps of forming the iris by applying to the surface of one of said members a plurality of successive layers, alternately of pigmented drying material and unpigmented substantially clear drying material, each layer being dried before application of the succeeding layer, the pigmented drying material being applied as distinctly separate and individual areas spaced on the receiving surface from the other layers, and the unpigmented drying material being applied as continuous coatings filling up the spaces between said spaced pigmented areas and presenting a relatively smooth surface for the succeeding layer, subsequently assemblying the members with said layered surface disposed interiorly of the complete assembly, and uniting the assembly into an integral body.

RUDOLPH E. BUSCH.

References Cited in the file of this patent

UNITED STATES PATENTS

| Number | Name | Date |
|---|---|---|
| 1,763,312 | Marcus | June 10, 1930 |
| 1,979,321 | Dunner | Nov. 6, 1934 |
| 1,993,121 | Travers | Mar. 5, 1935 |
| 2,497,873 | Erpf | Feb. 21, 1950 |

OTHER REFERENCES

OBrig. "Contact Lenses" (Copyright 1942) page 193. (Copy available in Division 7.)

Canadian Industries Limited Oval, December 1944, pp. 8 and 9, "Apt Pupils" by E. McKechnie. (A copy is in Div. 55 of the Patent Office.)